US007600674B1

(12) United States Patent  (10) Patent No.: US 7,600,674 B1
Marah et al.  (45) Date of Patent: Oct. 13, 2009

(54) INTEGRATED PREPAID SYSTEM AND METHOD

(75) Inventors: Stephen R. Marah, Olathe, KS (US); Inge B. Martens, Bonner Springs, KS (US); Mark Peden, Olathe, KS (US); Nataraj Sampath, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 300 days.

(21) Appl. No.: 10/963,199

(22) Filed: Oct. 12, 2004

(51) Int. Cl.
*G06K 5/00* (2006.01)
(52) U.S. Cl. .................. 235/380; 235/375; 235/382
(58) Field of Classification Search .............. 235/380, 235/375, 382; 705/49, 44, 4
See application file for complete search history.

(56) References Cited

U.S. PATENT DOCUMENTS

| | | | |
|---|---|---|---|
| 5,409,092 A | 4/1995 | Itako et al. | |
| 5,577,109 A * | 11/1996 | Stimson et al. | 379/114.2 |
| 5,744,787 A * | 4/1998 | Teicher | 235/380 |
| 5,991,413 A | 11/1999 | Arditti et al. | |
| 5,991,748 A | 11/1999 | Taskett | |
| 6,185,292 B1 * | 2/2001 | Miloslavsky | 379/265.01 |
| 6,314,171 B1 * | 11/2001 | Dowens | 379/144.01 |
| 6,327,363 B1 * | 12/2001 | Henderson et al. | 379/265.01 |
| 6,473,500 B1 * | 10/2002 | Risafi et al. | 379/144.01 |
| 6,507,644 B1 | 1/2003 | Henderson et al. | |
| 6,510,998 B1 * | 1/2003 | Stanford et al. | 235/492 |
| 6,595,416 B1 | 7/2003 | Newsome et al. | |
| 6,728,353 B1 * | 4/2004 | Espejo et al. | 379/114.2 |
| 2001/0040949 A1 * | 11/2001 | Blonder et al. | 379/144.01 |
| 2003/0009382 A1 * | 1/2003 | D'Arbeloff et al. | 705/17 |
| 2003/0050043 A1 | 3/2003 | Ohrstrom et al. | |
| 2004/0129777 A1 * | 7/2004 | Smith | 235/380 |
| 2004/0133511 A1 * | 7/2004 | Smith et al. | 705/39 |
| 2004/0211830 A1 * | 10/2004 | Algiene | 235/379 |

OTHER PUBLICATIONS

IBM Technical Disclosure Bulletin, Data Collection Terminal Concentrator, Jun. 1, 1992, vol. 35, Issue: 1A, pp. 144-145.*

* cited by examiner

*Primary Examiner*—Seung H Lee

(57) ABSTRACT

An integrated prepaid system is provided. The integrated prepaid system includes a communication interface configured to receive a prepaid card transaction. The integrated prepaid system further includes a processing system configured to translate the prepaid card transaction, validate the prepaid card transaction, select an appropriate transaction rule set, and select an appropriate processing routine. The processing system can perform a PIN sponsor prepaid card refresh, perform a PIN gratis prepaid card refresh, perform a PIN suspension, perform a prepaid card expiration date inquiry, and perform a prepaid card expiration date extension.

25 Claims, 6 Drawing Sheets

INTEGRATED PREPAID SYSTEM AND METHOD

RELATED APPLICATIONS

Not applicable

MICROFICHE APPENDIX

Not applicable

BACKGROUND OF THE INVENTION

1. Field of the Invention

The invention is related to a prepaid card, and in particular, to an integrated prepaid system.

2. Description of the Prior Art

A prepaid system comprises a system wherein a user pays for an account and then can later use the prepaid account to pay for the purchase of goods or services. The user can conduct transactions with the prepaid account, wherein merchants or sellers can debit from the prepaid amount stored within the prepaid account. The prepaid account can include a prepaid card that the user can carry and employ in transactions. One example of a prepaid card is a prepaid telephone card that is used to pay for telephone service. The term refresh refers to an operation of adding additional value to an existing prepaid account.

A prior art prepaid system can perform basic prepaid account operations. A prior art prepaid system can select and execute a required prepaid processing routine/application and can perform financial transactions on the prepaid account, such as debiting the prepaid account for purchases of goods or services. A prior art prepaid system can perform a personal identification number (PIN) activation or deactivation through a point of sale (POS) merchant, wherein a PIN for a prepaid account can be activated and/or deactivated. A prior art prepaid system can perform a PIN in-store refresh, wherein a POS merchant can add value, such as in minutes or dollars, to a prepaid account user's preexisting prepaid account. A prior art prepaid system can add a bonus value within a refresh transaction. Likewise, another prior art capability is that a prior art prepaid system can perform an in-store refresh refund operation through a POS merchant and can therefore refund a PIN in-store refresh operation. A prior art prepaid system can perform a balance inquiry operation, displaying a preexisting prepaid account. A prior art prepaid system can perform a batch prepaid card activation. A prior art prepaid system can perform a multipack prepaid card activation or deactivation. A prior art prepaid system can perform a PIN status inquiry and a single PIN activation.

A prior art prepaid system can perform the prepaid transactions described above. The prior art prepaid system can include a protocol-to-protocol handler, a rules database, a processing server, and a forwarding server. The prior art prepaid system can receive a prepaid transaction from POS terminals, from voice recognition units (VRUs) of a voice telephone network, from world-wide web connections, or from other connections. A prepaid transaction is received in the protocol-to-protocol handler and is passed on to the processing server if the prepaid transaction is received in a proper protocol. The processing server validates the transaction type with the rules database and determines which prepaid application is to be run by selecting an appropriate application platform identifier. The processing server passes the prepaid transaction and the determined prepaid application to the forwarding server. The forwarding server validates the application platform identifier and the transaction type received from the processing server. The forwarding server also determines where the transaction is to be sent in order to be processed by the selected application platform. The transaction can be transmitted to various types of application/processing servers for the requested prepaid account processing, including performing prepaid account database management operations, performing billing operations, and performing reporting operations.

SUMMARY OF THE INVENTION

An integrated prepaid system is provided according to an embodiment of the invention. The integrated prepaid system comprises a communication interface configured to receive a prepaid card transaction. The integrated prepaid system further comprises a processing system configured to translate the prepaid card transaction into a predetermined protocol, validate the prepaid card transaction, select an appropriate transaction rule set for the prepaid card transaction, and select an appropriate processing routine. The processing system is further configured to perform a PIN sponsor prepaid card refresh if specified by the transaction rule set, perform a PIN gratis prepaid card refresh if specified by the transaction rule set, perform a PIN suspension if specified by the transaction rule set, perform a prepaid card expiration date inquiry if specified by the transaction rule set, and perform a prepaid card expiration date extension if specified by the transaction rule set.

An integrated prepaid system method is provided according to an embodiment of the invention. The method comprises receiving a prepaid card transaction in an integrated prepaid system, translating the prepaid card transaction into a predetermined protocol, and validating the prepaid card transaction. The method further comprises selecting an appropriate transaction rule set for the prepaid card transaction and selecting an appropriate processing routine. The method further comprises performing a PIN sponsor prepaid card refresh if specified by the transaction rule set, performing a PIN gratis prepaid card refresh if specified by the transaction rule set, performing a PIN suspension if specified by the transaction rule set, performing a prepaid card expiration date inquiry if specified by the transaction rule set, and performing a prepaid card expiration date extension if specified by the transaction rule set.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
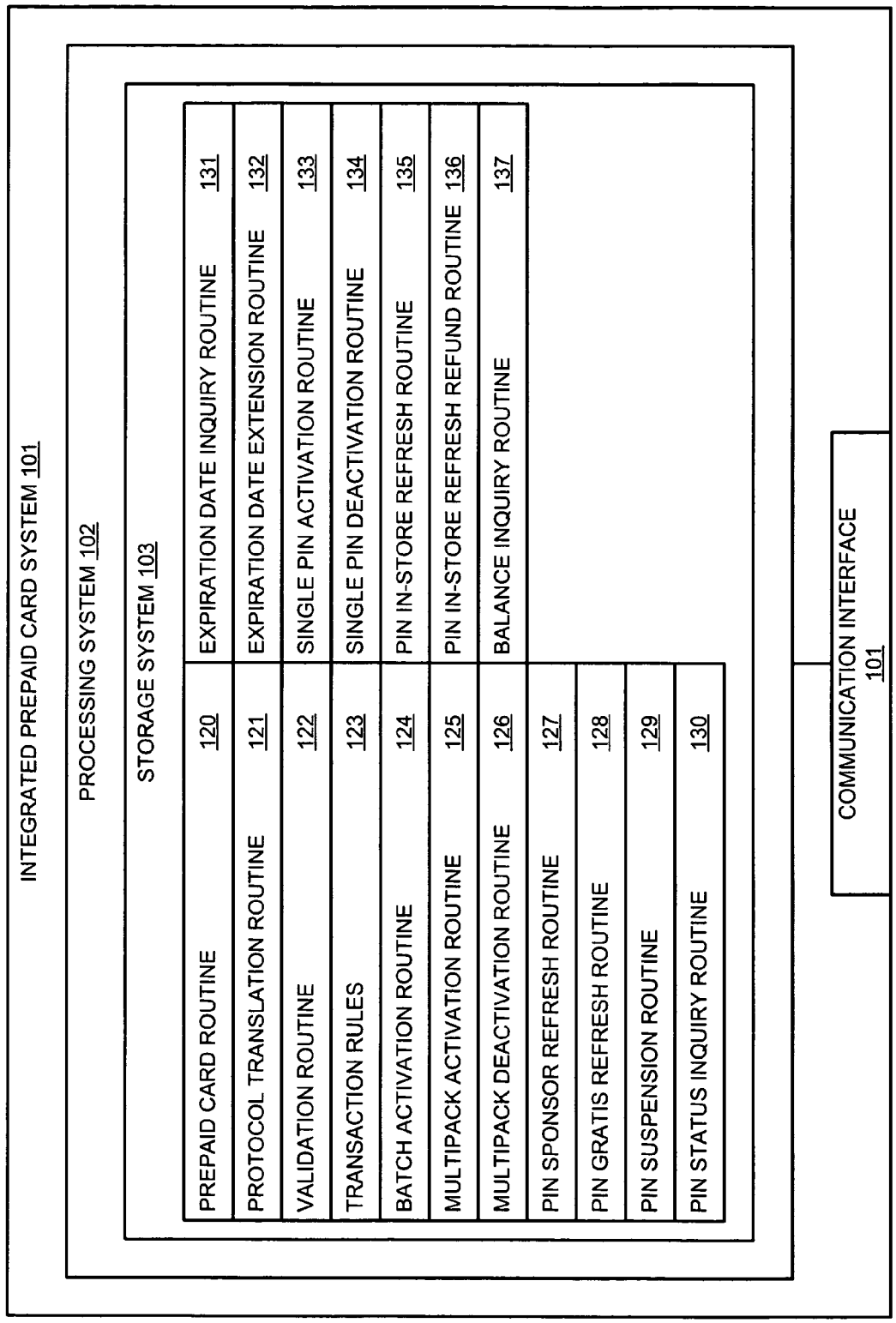
FIG. 1 shows an integrated prepaid system according to an embodiment of the invention.

FIG. 1 shows an integrated prepaid system 100 according to an embodiment of the invention. The integrated prepaid system 100 includes a communication interface 101 coupled to a processing system 102. The processing system 102 includes a storage system 103. The integrated prepaid system 100 performs operations for prepaid cards, including prepaid telephone cards, for example. The integrated prepaid system 100 can perform a variety of prepaid operations, as will be discussed in further detail below.

The integrated prepaid system 100 is a system that advantageously incorporates multiple different prepaid functionalities. The integrated prepaid system 100 can be accessed by a prepaid account user, by a point of sale (POS) merchant, or by the prepaid account provider. The integrated prepaid system 100 provides all necessary account functions/actions, and therefore provides a single point of presence that can be used to administer and service prepaid accounts.

In another advantage, the integrated prepaid system 100 can include existing prepaid system components. The integrated prepaid system 100 can include and can integrate existing prepaid system components, such as account databases, control systems, and POS terminals or devices, for example, into a single system that can be accessed for servicing prepaid accounts (see FIGS. 3-4 and the accompanying discussion). The integrated prepaid system 100 can enable external access to one or more prepaid system components, and can enable communications and transactions between prepaid system components.

The integrated prepaid system 100 can comprise a component of a communication network or can communicate with other devices over some manner of communication network. The integrated prepaid system 100 can comprise a component of a financial network or can communicate with a financial network.

The communication interface 101 enables communications with other electronic devices over a communication network or communication link. The communication interface 101 can communicate with a connectionless network or a connection-type (i.e., switching) network, such as computer networks, telephone networks, and other communication networks, such as financial networks. The communication interface 101 enables communications with other computers, computer devices, or network devices. The communication interface 101 can communicate with a computer network, a telephone network, with a voice recognition unit (VRU) resident in the telephone network, with a POS terminal or device, or with a service processor in communication with a plurality of POS terminals.

The processing system 102 controls general operations of the integrated prepaid system 100. The processing system 102 can comprise a computer microprocessor, logic circuit, or some other processing device. The processing system 102 can be distributed among multiple processing devices. The processing system 102 retrieves and executes a prepaid routine 120 from the storage system 103. The prepaid routine 120 can comprise an application program, firmware, or some other form of machine-readable processing instructions.

The storage system 103 stores software routines, settings, and data for the processing system 102. The storage system 103 can comprise a disk, tape, integrated circuit, or some other memory device. The storage system 103 can be distributed among multiple memory devices. The storage system 103 can comprise an integral component of the processing system 102 or can comprise an associated storage device or devices. In one embodiment, the storage system 103 stores processing routines and processing data. In one embodiment, the storage system 103 stores a prepaid routine 120, a protocol translation routine 121, a validation routine 122, transaction rules 123, a batch activation routine 124, a multipack activation routine 125, a multipack deactivation routine 126, a PIN sponsor refresh routine 127, a PIN gratis refresh routine 128, a PIN suspension routine 129, a PIN status inquiry routine 130, an expiration data inquiry routine 131, an expiration date extension routine 132, a single PIN activation routine 133, a single PIN deactivation routine 134, a PIN in-store refresh routine 135, a PIN in-store refresh refund routine 136, and a balance inquiry routine 137. It should be understood that other software routines and data can be stored in the storage system 103 and/or used by the processing system 102, and are within the scope of the claims and description.

The prepaid routine 120 can be used by the processing system 102 to perform operations for the integrated prepaid system 100. The prepaid routine 120 can control communications, process inputs and outputs, and perform prepaid transactions received in the integrated prepaid system 100. The prepaid routine 120 in one embodiment can perform the processing steps depicted in the flowchart 200 of FIG. 2.

The protocol translation routine 121 can be used by the integrated prepaid system 100 to perform any necessary protocol translations. For example, a protocol translation may need to be performed on received prepaid transactions if their protocol is not the protocol being used by the integrated prepaid system 100.

The validation routine 122 can perform validation operations for a prepaid account and/or for a prepaid transaction. The validation can include verifying the prepaid account user, verifying the account number, verifying a PIN number, verifying an account balance, etc.

The transaction rules 123 contain rules that specify how transactions are processed. For example, the transaction rules 123 can include rules for protocol translation, wherein if a prepaid transaction is received in a first communication or financial protocol, a corresponding transaction rule can specify how the transaction is to be translated into a predetermined protocol, where the translated prepaid transaction can be processed by the integrated prepaid system 100. The transaction rules 123 can further control or determine the processing operations that can be performed for a requested prepaid transaction and consequently can determine the processing routine(s) to be used.

The batch activation routine 124 can comprise a routine for activating a batch of prepaid cards. The batch activation routine 124 can process prepaid cards that are specified by PIN numbers, by account numbers, etc.

The multipack activation routine 125 and the multipack deactivation routine 126 can activate or deactivate prepaid cards in a multipack. The prepaid cards in a multipack can be specified by a first PIN number, by a first account number, etc., and further by a number of cards in the multipack.

The PIN sponsor refresh routine 127 can enable a PIN sponsor, such as a POS merchant, for example, to perform a refresh of a prepaid account. As a result, the prepaid account user can go to an appropriate POS merchant and refresh the prepaid card.

The PIN gratis refresh routine 128 can enable a prepaid account provider to perform a gratis refresh. For example, for promotional purposes, a telephone service provider can use a corresponding gratis refresh transaction to add a gratis amount to a prepaid account. In addition, the PIN gratis refresh routine 128 can enable the prepaid account provider to add a gratis amount to some other refresh operation.

The PIN suspension routine 129 can enable a prepaid PIN to be suspended. The suspension request can be received from various sources, including the prepaid account user himself or herself.

The PIN status inquiry routine 130 can enable the status of a PIN to be checked. The PIN status inquiry can return a PIN status, such as non-activated, activated, suspended, etc. This may be a desirable capability for the prepaid account user, for a POS merchant distributing prepaid cards, or a prepaid account provider.

The expiration date inquiry routine 131 can enable the expiration date to be reported. The expiration date can be queried by a prepaid account user, by a POS merchant, or by an agent or representative of the prepaid account provider.

The expiration date extension routine 132 can enable the expiration date of a prepaid account to be extended. For example, the expiration date could be extended by additional days, weeks, months, etc. The expiration date extension routine 132 can be a portion of a refresh operation, wherein the preexisting prepaid account, the expiration date, or both can be extended by the prepaid account user, the POS merchant, or the prepaid account provider.

The single PIN activation routine 133 and the single PIN deactivation routine 134 can enable the activation or deactivation of the PIN of a single prepaid card. The single PIN activation routine 133 and the single PIN deactivation routine 134 can be used by a prepaid account user, a POS merchant, or a prepaid account provider.

The PIN in-store refresh routine 135 and the PIN in-store refresh refund routine 136 can enable refresh and refresh refund operations in a store. The refresh or refresh refund can be performed by the POS merchant or store personnel, for example.

The balance inquiry routine 137 enables a prepaid balance to be requested and reported. For example, the prepaid account user can use a corresponding balance inquiry transaction in order to determine the balance remaining in a preexisting prepaid account. In addition, in some embodiments a POS merchant can use the balance inquiry transaction to determine whether a financial transaction requested by the prepaid account user can be performed.

Figure 2A:
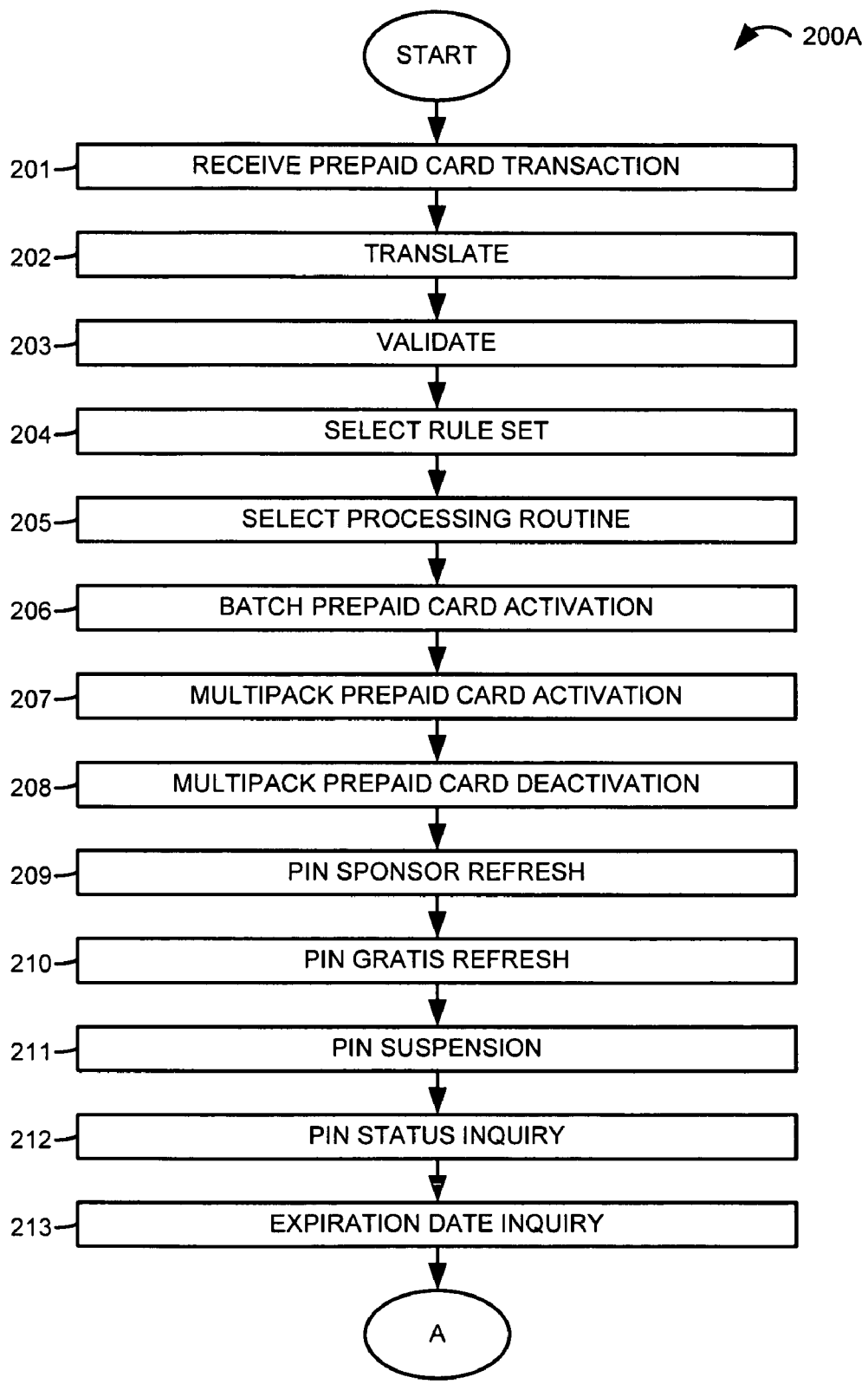
FIGS. 2A-2B is a flowchart of an integrated prepaid system method according to an embodiment of the invention.
Figure 2B:
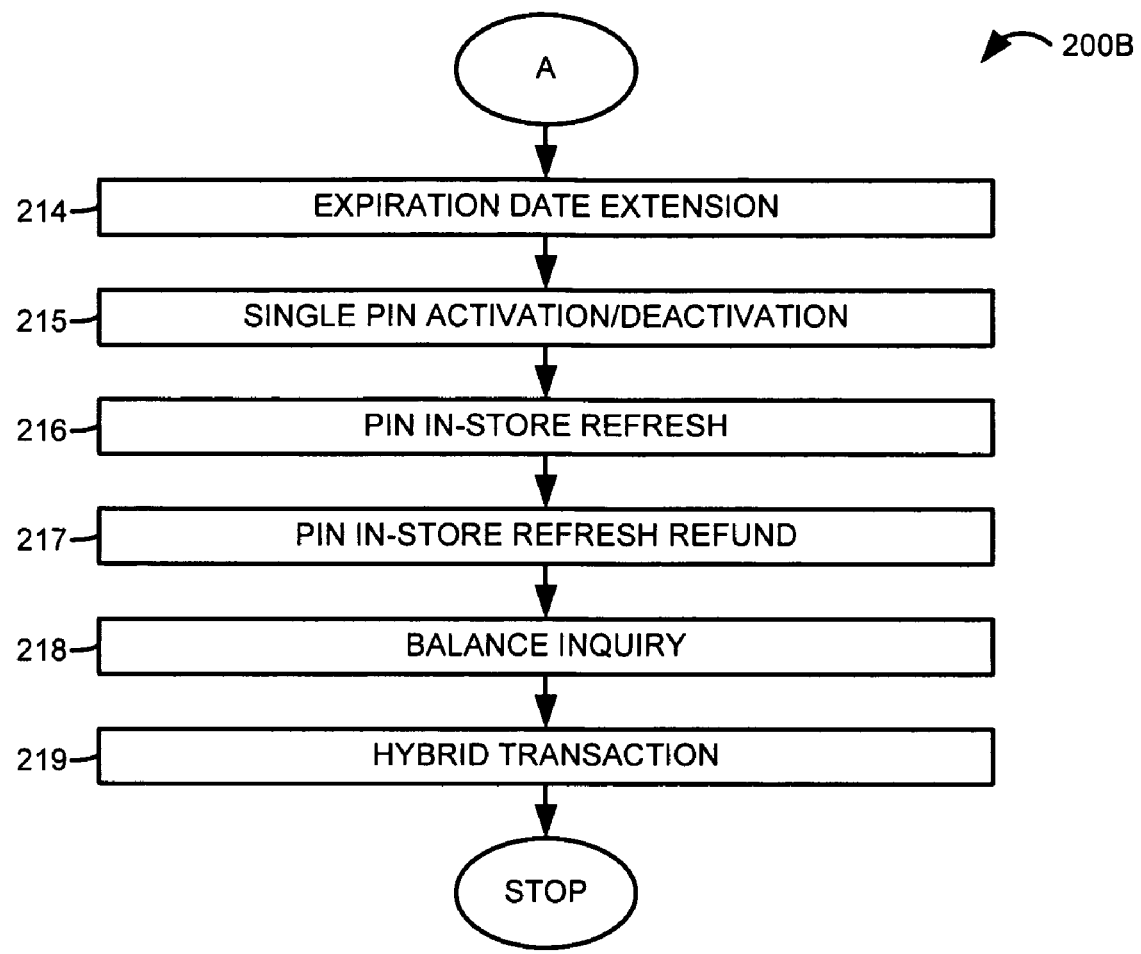

FIGS. 2A-2B is a flowchart of an integrated prepaid system method 200 according to an embodiment of the invention. In step 201, the integrated prepaid system 100 receives a prepaid transaction. The transaction can be received from a prepaid account user, from a prepaid sponsor, or from a prepaid account provider.

The prepaid transaction can comprise one or more actions to be performed for a prepaid account. A single received transaction can comprise a hybrid transaction comprising two or more actions to be performed. For example, a received transaction can comprise a single PIN activation operation plus a balance inquiry operation.

In step 202, the integrated prepaid system 100 translates the prepaid transaction into a predetermined protocol, such as a predetermined communication protocol and/or a predetermined financial protocol. The translation is performed if the prepaid transaction is not already in the predetermined protocol. The translation enables the integrated prepaid system 100 to interact with multiple prepaid cards and with multiple communication networks. In this manner, the integrated prepaid system 100 can service many different prepaid cards and with many different prepaid account providers.

In step 203, the integrated prepaid system 100 validates the prepaid transaction. This can include any manner of account verification, PIN verification, etc. The validation can include communicating with any manner of relevant account server or service processor in order to perform the verification operations.

In step 204, the integrated prepaid system 100 selects an appropriate transaction rule set for the prepaid transaction. The transaction rule set can be selected from the transaction rules 123, as previously discussed. The transaction rule set can specify operations that are to be performed for the prepaid account and the prepaid transaction, and in one embodiment can further specify the processing routines that are to be employed.

In step 205, the integrated prepaid system 100 selects an appropriate processing routine or routines. The selection in one embodiment is based on the transaction rule set. The selected processing routine(s) is used to perform the received prepaid transaction. Exemplary processing routines are discussed below. However, it should be understood that additional processing routines can be included in the method, and are within the scope of the description and claims.

In step 206, the integrated prepaid system 100 performs a batch prepaid activation if specified by the transaction rule set. For example, where a vendor or sponsor has a batch of cards to distribute, the batch can be activated, such as by the specification of beginning and ending account or PIN numbers of the batch. Consequently, a vendor or sponsor does not have to individually activate the prepaid cards.

In step 207, the integrated prepaid system 100 performs a multipack prepaid activation if specified by the transaction rule set. Multiple prepaid cards can be shipped or provided in a multipack that includes a fixed number of prepaid cards, such as ten or twelve prepaid cards in a multipack, as an example. A multipack activation could require entry of an account number of a first prepaid in the multipack, along with a number of cards in the multipack. Alternatively, the number of cards could be known and assumed by the method.

In step 208, the integrated prepaid system 100 performs a multipack prepaid deactivation if specified by the transaction rule set. Similar to the multipack activation above, the multipack deactivation can deactivate the multiple prepaid cards in a pack.

In step 209, the integrated prepaid system 100 performs a PIN sponsor prepaid refresh if specified by the transaction rule set. The PIN sponsor refresh comprises a prepaid refresh performed by a sponsor, such as a POS merchant, for example.

In step 210, the integrated prepaid system 100 performs a PIN gratis prepaid refresh if specified by the transaction rule set. The PIN gratis refresh can comprise a refresh of a predetermined amount contributed by the prepaid account provider. The PIN gratis refresh can comprise a promotional or additional amount given to the prepaid account upon the occurrence of some threshold condition, such as a predetermined level of usage by the prepaid account user, for example, or given upon a customer service event.

In step 211, the integrated prepaid system 100 performs a PIN suspension if specified by the transaction rule set. The PIN suspension can be performed upon occurrence of some suspension threshold, such as a request by the prepaid account user, the prepaid balance dropping to zero, theft or loss of the prepaid card, etc.

In step 212, the integrated prepaid system 100 performs a PIN status inquiry if specified by the transaction rule set. The PIN status inquiry can return a current status of the PIN and/or of the prepaid card, such as activated, non-activated, suspended, etc.

In step 213, the integrated prepaid system 100 performs a prepaid expiration date inquiry if specified by the transaction rule set. The inquiry returns the expiration date of the prepaid card.

In step 214, the integrated prepaid system 100 performs a prepaid expiration date extension if specified by the transaction rule set. The extension can extend the expiration date of the prepaid account by a predetermined time amount or by a requested time amount, for example.

In step 215, the integrated prepaid system 100 performs a single PIN activation or deactivation if specified by the transaction rule set. The single PIN activation activates a single prepaid card, such as by entry of an appropriate account number and/or PIN, for example. Likewise, the single PIN deactivation deactivates a single prepaid card.

In step 216, the integrated prepaid system 100 performs a PIN in-store refresh if specified by the transaction rule set. The PIN in-store refresh comprises a refresh operation performed by a POS merchant for the prepaid account user.

In step 217, the integrated prepaid system 100 performs a PIN in-store refresh refund if specified by the transaction rule set. Therefore, if the prepaid account user decides to reverse a refresh operation, the prepaid account user can get the refresh amount refunded.

In step 218, the integrated prepaid system 100 performs a balance inquiry if specified by the transaction rule set. The balance inquiry can return a monetary or other value indicating the current value of the prepaid account.

In step 219, the integrated prepaid system 100 performs a hybrid transaction if specified by the transaction rule set. As was previously noted, the hybrid transaction can comprise two or more prepaid account actions that are performed in response to a single prepaid transaction request.

Figure 3:
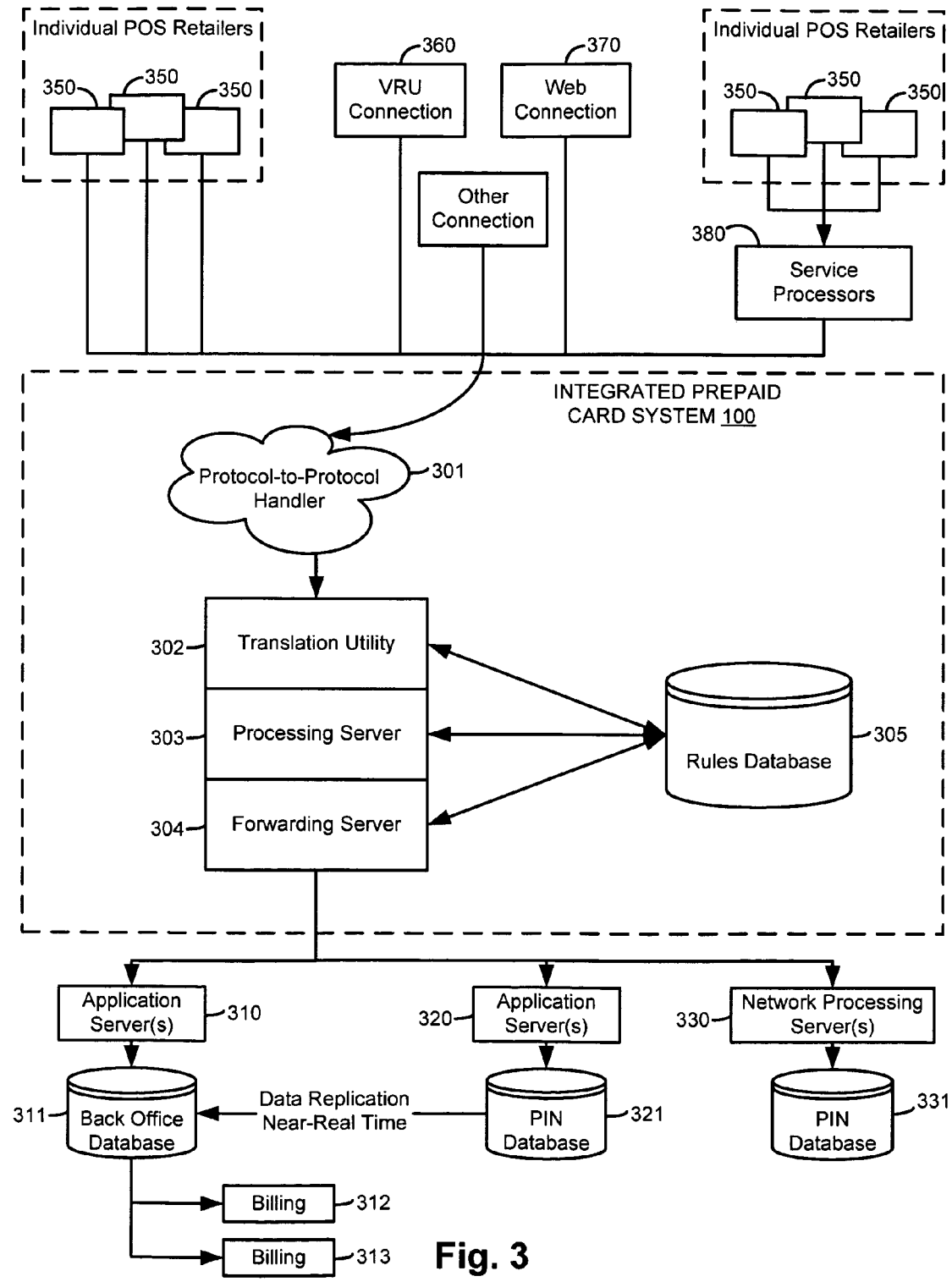
FIG. 3 shows an integrated prepaid system according to another embodiment of the invention.

FIG. 3 shows an integrated prepaid system 100 according to another embodiment of the invention. The integrated prepaid system 100 can include the previously discussed routines and data and can perform the previously discussed processing operations. In this embodiment, the integrated prepaid system 100 can communicate with and receive prepaid transactions from POS merchants/retailers 350, from a VRU 360 of a telephone network (in communication with and receiving voice communications from a prepaid account user, POS merchant, or representative of a prepaid account provider), from some manner of computer network or computer network interface device 370 (such as a web connection), or from a service processor 380. Examples of service processors are the prepaid/gift card service processor and/or POS transaction services/systems available from Stored Value Systems, Louisville, Ky., and Atrana Solutions Inc., Dallas, Tex.

The integrated prepaid system 100 in this embodiment includes a protocol-to-protocol handler 301, a translation utility 302, a processing server 303, a forwarding server 304, and a rules database 305. The protocol-to-protocol handler 301 receives incoming prepaid transactions in one of potentially multiple protocols.

The translation utility 302 performs protocol conversions on the incoming prepaid transactions. The protocol conversion can include conversion into a predetermined communication protocol and/or conversion into a predetermined financial protocol, if needed.

The processing server 303 receives the incoming, translated prepaid transaction. The processing server 303 determines an appropriate transaction rule set for the transaction and retrieves the transaction rule set from the rules database 305. The processing server 303 processes the transaction with the transaction rule set and generates one or more prepaid account actions or commands to be performed. The processing server 303 communicates the actions or commands to the forwarding server 304.

The forwarding server 304 passes the actions or commands to appropriate prepaid processing entities which perform the actions or commands. The rule set can optionally specify the appropriate processing entity to the forwarding server 304.

The integrated prepaid system 100 can communicate with prepaid processing elements comprising one or more application server(s) 310, a back office database 316, a billing system 312, and a reports system 313. The integrated prepaid system 100 can communicate with the one or more application servers 310, the back office database 316, the billing system 312, and the reports system 313 over any manner of network. The application server(s) 310 can retrieve prepaid account data, can process and change the account data, can perform account adjustments using the billing system 312, and can generate audit data using the reports system 313.

The integrated prepaid system 100 can further communicate with prepaid processing elements comprising one or more application servers 320 and a PIN database 321. The PIN database 321 in one embodiment can communicate with the back office database 311. The application servers 320 can receive and process actions or commands based on an included PIN, wherein the transaction results and the PIN are passed to the back office database 311 for billing and reporting. Alternatively, the billing and reporting are performed by the application server 320 and are stored in the PIN database 321.

The integrated prepaid system 100 can further communicate with prepaid processing elements comprising one or more network processing servers 330 and an associated PIN database 331. A network processing server 330 in one embodiment comprises an Internet Protocol (IP) network processing server 330. However, it should be understood that other connectionless network protocols can be employed by a network processing server 330. The network processing server 330 in one embodiment is configured to communicate the actions or commands to other processing devices located on computer networks for specified processing and completion. For example, the network processing server 330 and the PIN database 331 can be devices located on a Local Area Network (LAN), Wide Area Network (WAN), on the Internet, etc. Billing and reporting can be performed by the network processing server 330 and can be stored in the PIN database 331.

Figure 4:
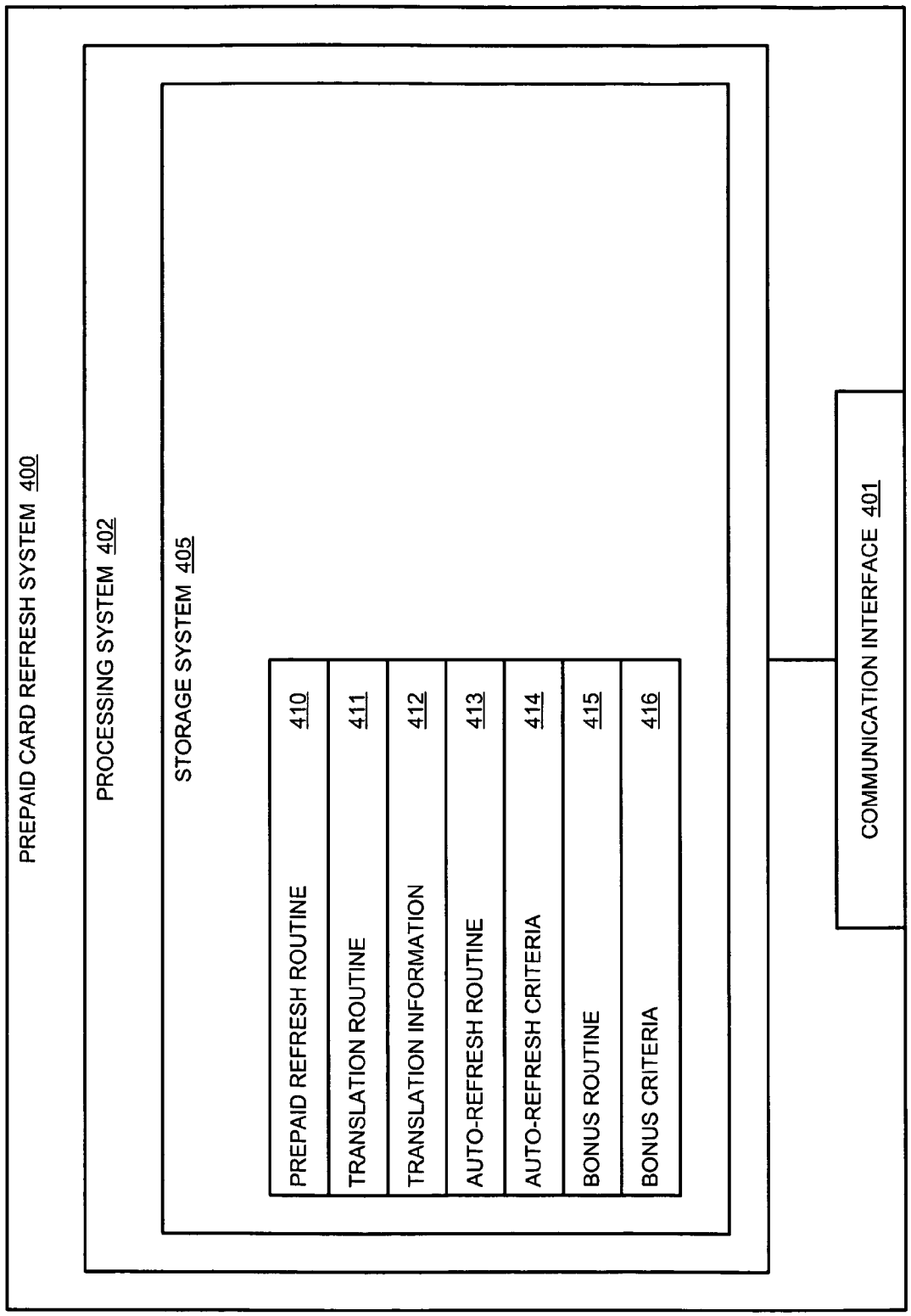
FIG. 4 shows a prepaid card refresh system according to an embodiment of the invention.
Figure 5:
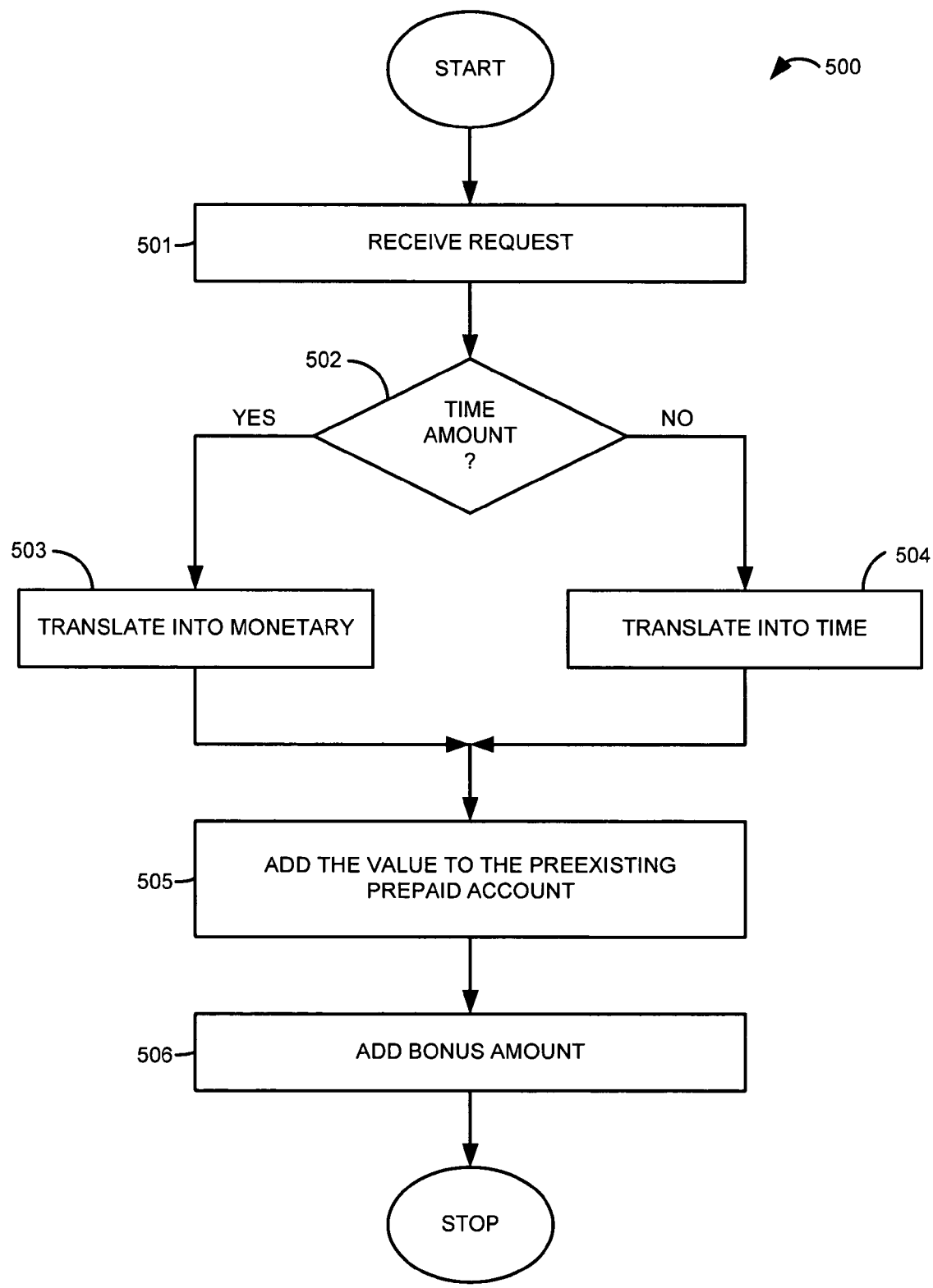
FIG. 5 is a flowchart of a prepaid card refresh method according to an embodiment of the invention.

It should be noted that the integrated prepaid system and method of FIGS. 1-3 can additionally include the components and/or functionality of the prepaid refresh system and method of FIGS. 4-5. As a result, the integrated prepaid system and method can additionally perform other prepaid operations, as described below.

FIG. 4 shows a prepaid refresh system 400 according to an embodiment of the invention. The prepaid refresh system 400 includes a communication interface 401 coupled to a processing system 402. The processing system 402 includes a storage system 405. The prepaid refresh system 400 can comprise a component of a communication network (not shown) or can communicate with other devices over some manner of communication network. The prepaid refresh system 400 in one embodiment can perform operations for preexisting prepaid accounts, including prepaid telephone cards, for example.

Although the prepaid refresh system 400 is shown as a single device, it should be understood that alternatively the prepaid refresh system 400 can comprise multiple, distributed components that cooperate to perform a refresh (i.e., an add value) operation. Advantageously, the prepaid refresh system 400 can include and can integrate existing prepaid system components, such as account databases, control systems, and POS terminals and devices, for example, into a single system that can be accessed for servicing prepaid accounts (see FIGS. 1-3 and the accompanying discussion). The prepaid refresh system 400 can enable external access to one or more prepaid system components, and can enable communications and transactions between prepaid system components.

The communication interface 401 enables communications with other electronic devices, such as computer networks, telephone networks, and other communication networks, such as financial networks. The communication interface 401 enables communications with other computers, computer devices, or network devices.

The processing system 402 controls general operations of the prepaid refresh system 400. The processing system 402 can comprise a computer microprocessor, logic circuit, or some other processing device. The processing system 402 can be distributed among multiple processing devices. The processing system 402 retrieves and executes a prepaid refresh routine 410 from the storage system 405. The prepaid refresh routine 410 can comprise an application program, firmware, or some other form of machine-readable processing instructions.

The storage system 405 stores software routines, settings and data, temporary working data, etc., for the processing system 402. The storage system 405 can comprise a disk, tape, integrated circuit, or some other memory device. The storage system 405 can be distributed among multiple memory devices. The storage system 405 can comprise an integral component of the processing system 402 or can comprise an associated storage device or devices. In one embodiment, the storage system 405 stores the prepaid refresh routine 410, a translation routine 411, translation information 412, an auto-refresh routine 413, auto-refresh criteria 414, a bonus routine 415, and bonus criteria 416.

The prepaid refresh routine 410 can be used by the processing system 402 to perform refresh operations (i.e., add value operations) for a prepaid card. The prepaid refresh routine 410 receives a request from a user to add value to a preexisting prepaid account (see FIG. 5 and the accompanying text). In the request, the user is allowed to specify the value in either a monetary amount or a time amount. The prepaid refresh routine 410 translates a monetary amount into a time amount and reports the time amount to the user if the monetary amount is specified in the request. The prepaid refresh routine 410 translates a time amount into a monetary amount and reports the monetary amount to the user if the time amount is specified in the request. The time amount can comprise time units of a transaction, such as domestic local call rates, domestic long distance call rates, overseas call rates, etc. The request can be initiated by a prepaid account user, by a POS merchant, or by a prepaid account provider. In addition, the prepaid refresh routine 410 can perform any necessary account verification or account authorization needed for the subject prepaid account, if required. In this manner, an existing prepaid account or prepaid card can be repeatedly or continuously refreshed and used by the prepaid account user.

The translation routine 411 and the translation information 412 can perform protocol translation. For example, the translation routine 411 and the translation information 412 can be used by the prepaid refresh routine 410 to translate a refresh amount from the time amount into the monetary amount (and vice versa) so that the value can be added to the preexisting prepaid account.

The auto-refresh routine 413 and the auto-refresh criteria 414 can be used by the prepaid refresh routine 410 to perform an automatic refresh, wherein the refresh is not requested by the prepaid account user. In one embodiment, a request can be automatically generated in order to automatically refresh a preexisting prepaid account, such as by the prepaid account provider. The automatic refresh is performed according to the auto-refresh criteria 413, and can refresh the prepaid account by a predetermined automatic refresh amount. The auto-refresh criteria 413 can include any criteria. In one embodiment, the auto-refresh criteria 413 comprises a time period, wherein the auto-refresh is performed upon the expiration of a predetermined time period. In another embodiment, the auto-refresh criteria 413 comprises a balance threshold, wherein the auto-refresh is performed upon the preexisting prepaid account dropping below a predetermined balance threshold. In yet another embodiment, the auto-refresh criteria 413 comprises a usage threshold, wherein the auto-refresh is performed upon the usage of the prepaid exceeding a predetermined usage threshold. In yet another embodiment, the auto-refresh criteria 413 can comprise combinations of the above criteria.

The bonus routine 415 and the bonus criteria 416 can be used by the prepaid refresh routine 410 to add a bonus amount. Therefore, in one embodiment, the value comprises a bonus value. Alternatively, in another embodiment the bonus can be in addition to the value in the request, i.e., the bonus can comprise a bonus value beyond the value included in the request. The bonus amount can be determined by the bonus criteria 416. In addition, the occurrence and frequency of the bonus can also be determined by the bonus criteria 416. The bonus criteria 416 can be initiated and set by a prepaid account provider or by a POS merchant acting as a prepaid sponsor.

FIG. 5 is a flowchart 500 of a prepaid refresh method according to an embodiment of the invention. In step 501, a request is received from a user to add value to a preexisting prepaid account. In the request, the user is allowed to specify the value in either a monetary amount or a time amount.

The request can be received from different sources. The request can be received from the prepaid account user. The prepaid account user can generate the request using a telephone system or a computer network, for example. The prepaid account user in one embodiment can access a menu or directory that guides the prepaid account user through a request operation. Alternatively, the request can be received from a POS merchant, wherein the POS merchant can provide the refresh capability to the prepaid account user through a POS terminal. For example, a POS merchant can swipe a prepaid card of the user and can perform the refresh, such as by charging a refresh amount onto a credit or debit card of the prepaid account user or in exchange for some manner of payment by the prepaid account user. In another alternative, a prepaid account provider (such as a telephone service provider, for example) can generate the request, wherein the account provider can perform the refresh in exchange for payment by the prepaid account user or can perform a free refresh for the prepaid account user in some circumstances, such as for promotional or marketing purposes, for example.

In step 502, the method determines whether the request specifies a time amount or a monetary amount. If the request specifies a time amount, the method proceeds to step 503; otherwise, the method proceeds to step 504.

In step 503, because the request specifies a time amount, the value is translated into a monetary amount. The translated monetary amount in some embodiments is reported back to the user.

In step 504, because the request specifies a monetary amount, the value is translated into a time amount. The translated time amount in some embodiments is reported back to the user.

In step 505, the value is added to the preexisting prepaid account. The preexisting prepaid account is now refreshed by the specified value. In one embodiment, the refreshing can be performed in prepaid account provider-defined increments. In one embodiment, the reporting performed in step 503 or 504 can include reporting the prepaid account balance after the adding of the value.

In optional step 506, the refresh can add a bonus amount beyond the value included in the request. The bonus amount can comprise a predetermined bonus amount, and can be set by a POS merchant or by a prepaid account provider, as previously discussed.

It should be noted that the prepaid refresh system and method of FIGS. 4-5 can additionally include the components and/or functionality of the integrated prepaid system and method of FIGS. 1-3. As a result, the prepaid refresh system and method can additionally perform other prepaid operations, as previously described.

The integrated prepaid system and method according to the invention can be employed according to any of the embodiments in order to provide several advantages, if desired. The invention can advantageously be used to integrate and centralize prepaid transactions and operations. The invention can advantageously be used to perform a complete range of prepaid operations. The invention can advantageously be accessed by a prepaid account user, by a POS merchant, or by a prepaid account provider. The invention can advantageously communicate with a connectionless network or with a connection-type network. The invention can advantageously provide an easily expandable and efficient prepaid system.

The prepaid account refresh system and method according to the invention can be employed according to any of the embodiments in order to provide several advantages, if desired. The invention can advantageously be used to refresh a preexisting prepaid account. The prepaid account refresh performs any necessary unit translation. For example, the refresh amount can be received in money (such as dollars or dollars and cents) and is subsequently translated into appropriate units, such as domestic call minutes, domestic long distance call units, overseas call minutes, etc. As a result, the prepaid refresh system and method can be used across prepaid cards and across prepaid platforms.

Advantageously, the prepaid account refresh system and method can be received from and initiated by various persons or entities, including by the prepaid account user, by a POS merchant, or by a prepaid account provider, for example. Other persons or entities could also initiate a refresh operation, such as a parent or friend, employer, etc.

Advantageously, a refresh operation can include a bonus amount. For example, when a prepaid account is refreshed, a refresh initiator (such as a POS merchant or prepaid account provider) can refresh the prepaid account to an amount above and beyond a refresh amount requested by the prepaid account user. In addition, the refresh bonus can include an extension of an expiration date of the prepaid card.

Advantageously, the refresh can be automatic, wherein a refresh of the prepaid balance is automatically performed upon the occurrence of certain refresh criteria. The refresh criteria can include the passage of a time period, the occurrence of a specified number of uses, the preexisting prepaid account falling below a refresh threshold, etc.

What is claimed is:

1. An integrated prepaid system, comprising:
    a communication interface configured to receive a prepaid card transaction in two or more protocols; and
    a processing system configured to translate the prepaid card transaction into a predetermined protocol, validate the prepaid card transaction, select an appropriate transaction rule set for the prepaid card transaction, select an appropriate processing routine as determined by the transaction rule set, perform a PIN sponsor prepaid card refresh if specified by the transaction rule set, perform a PIN gratis prepaid card refresh for promotional purposes if specified by the transaction rule set, perform a PIN suspension if specified by the transaction rule set, perform a prepaid card expiration date inquiry if specified by the transaction rule set, and perform a prepaid card expiration date extension if specified by the transaction rule set;
    wherein the transaction rule set comprises rules specifying how transactions are to be processed by the processing system.

2. The integrated prepaid system of claim 1, with the integrated prepaid system being configured to be accessed by a prepaid card cardholder, a prepaid card sponsor, or a prepaid card account provider.

3. The integrated prepaid system of claim 1, wherein the communication interface is configured to communicate with a computer network.

4. The integrated prepaid system of claim 1, wherein the communication interface is configured to communicate with a telephone network.

5. The integrated prepaid system of claim 1, wherein the communication interface is configured to communicate with a telephone network and with a voice recognition unit (VRU) resident in the telephone network.

6. The integrated prepaid system of claim 1, wherein the communication interface is configured to communicate with a POS terminal.

7. The integrated prepaid system of claim 1, wherein the communication interface is configured to communicate with a service processor in communication with a plurality of POS terminals.

8. The integrated prepaid system of claim 1, wherein the processing system is further configured to perform a PIN activation and a PIN deactivation.

9. The integrated prepaid system of claim 1, wherein the processing system is further configured to perform a PIN in-store refresh.

10. The integrated prepaid system of claim 1, wherein the processing system is further configured to perform a PIN in-store refresh refund.

11. The integrated prepaid system of claim 1, wherein the processing system is further configured to perform a balance inquiry.

12. The integrated prepaid system of claim 1, wherein the integrated prepaid system is configured to receive and perform a hybrid prepaid card account transaction comprising two or more prepaid card account actions.

13. The integrated prepaid system of claim 1, with the processing system further comprising:
    a protocol-to-protocol handler that is configured to receive the prepaid card transaction in a first protocol;
    a translation utility in communication with the protocol-to-protocol handler, with the translation utility being configured to translate the prepaid card transaction from the first protocol into a predetermined protocol;

a processing server in communication with the translation utility, with the processing server being configured to receive the incoming, translated prepaid card transaction, determine an appropriate transaction rule set for the prepaid card transaction, retrieve the transaction rule set from a rules database, process the prepaid card transaction with the transaction rule set, generate one or more prepaid card account actions to be performed, and communicate the one or more prepaid card account actions to a forwarding server; and the forwarding server in communication with the processing server, with the forwarding server being configured to communicate the one or more prepaid card account actions to one or more prepaid card processing entities which perform the one or more prepaid card account actions.

14. An integrated prepaid system method, comprising:

receiving a prepaid card transaction in an integrated prepaid system in two or more protocols;

translating the prepaid card transaction into a predetermined protocol;

validating the prepaid card transaction;

selecting an appropriate transaction rule set for the prepaid card transaction;

selecting an appropriate processing routine as determined by the transaction rule set;

performing a PIN sponsor prepaid card refresh if specified by the transaction rule set;

performing a PIN gratis prepaid card refresh for promotional purposes if specified by the transaction rule set;

performing a PIN suspension if specified by the transaction rule set;

performing a prepaid card expiration date inquiry if specified by the transaction rule set; and performing a prepaid card expiration date extension if specified by the transaction rule set;

wherein the transaction rule set comprises rules specifying how transactions are to be processed by the processing routine.

15. The method of claim 14, with the integrated prepaid system being configured to be accessed by a prepaid card cardholder, a prepaid card sponsor, or a prepaid card account provider.

16. The method of claim 14, wherein the communication interface is configured to communicate with a computer network.

17. The method of claim 14, wherein the communication interface is configured to communicate with a telephone network.

18. The method of claim 14, wherein the communication interface is configured to communicate with a telephone network and with a voice recognition unit (VRU) resident in the telephone network.

19. The method of claim 14, wherein the communication interface is configured to communicate with a POS terminal.

20. The method of claim 14, wherein the communication interface is configured to communicate with a service processor in communication with a plurality of POS terminals.

21. The method of claim 14, wherein the processing system is further configured to perform a PIN activation and a PIN deactivation.

22. The method of claim 14, wherein the processing system is further configured to perform a PIN in-store refresh.

23. The method of claim 14, wherein the processing system is further configured to perform a PIN in-store refresh refund.

24. The method of claim 14, wherein the processing system is further configured to perform a balance inquiry.

25. The method of claim 14, wherein the integrated prepaid system is configured to receive and perform a hybrid prepaid card account transaction comprising two or more prepaid card account actions.

\* \* \* \* \*